US 6,542,360 B2

(12) United States Patent
Koizumi (10) Patent No.: US 6,542,360 B2
(45) Date of Patent: Apr. 1, 2003

(54) ELECTRONIC APPARATUS CONTAINING HEAT GENERATING COMPONENT, AND EXTENSION APPARATUS FOR EXTENDING THE FUNCTION OF THE ELECTRONIC APPARATUS

(75) Inventor: Fumihiko Koizumi, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/892,871

(22) Filed: Jun. 28, 2001

(65) Prior Publication Data

US 2002/0018335 A1 Feb. 14, 2002

(30) Foreign Application Priority Data

Jun. 30, 2000 (JP) ........................................ 2000-200238

(51) Int. Cl.[7] ................................................. G06F 1/20
(52) U.S. Cl. ....................... 361/687; 361/683; 361/686; 361/689; 165/80.3; 364/708.1
(58) Field of Search ................................. 361/683, 686, 361/687, 704–712, 689, 692–695, 697, 698; 174/15.1, 15.2, 52.4, 252; 165/80.3, 80.4, 104.33, 185, 104.32, 104.34, 86; 395/281, 283, 750.08, 750.01, 700, 750.06; 62/3.2, 3.5, 3.7, 3.62, 259.2; 364/708.1; 454/184; 312/223.1, 223.2

(56) References Cited

U.S. PATENT DOCUMENTS

| | | | | |
|---|---|---|---|---|
| 5,424,913 A | | 6/1995 | Swindler | 361/687 |
| 5,704,212 A | * | 1/1998 | Erler et al. | 62/3.2 |
| 5,768,101 A | * | 6/1998 | Cheng | 361/687 |
| 6,094,347 A | * | 7/2000 | Bhatia | 361/695 |
| 6,191,943 B1 | * | 2/2001 | Tracy | 361/687 |
| 6,219,233 B1 | * | 4/2001 | Moore et al. | 361/687 |
| 6,259,601 B1 | * | 7/2001 | Jaggers et al. | 361/690 |
| 6,266,243 B1 | * | 7/2001 | Tomioka | 361/695 |
| 6,353,536 B1 | * | 3/2002 | Nakamura et al. | 361/686 |

FOREIGN PATENT DOCUMENTS

| | | | | |
|---|---|---|---|---|
| JP | 411163567 A | * | 6/1999 | H05K/7/20 |
| JP | 02001306186 A | * | 11/2001 | G06F/1/20 |

* cited by examiner

Primary Examiner—Darren Schuberg
Assistant Examiner—Michael Datskovsky
(74) Attorney, Agent, or Firm—Finnegan, Henderson, Farabow, Garrett & Dunner, L.L.P.

(57) ABSTRACT

An electronic apparatus has a housing that includes a bottom wall with a communication hole formed therein, and also has an extension apparatus on which the housing is removably mounted. The housing contains a heat generating component and a heat sink thermally connected thereto. The communication hole is opened and closed by a lid, which is always urged toward a position for closing the communication hole. The extension apparatus has operation members for forcibly opening the lid when the housing is mounted thereon.

15 Claims, 5 Drawing Sheets

ELECTRONIC APPARATUS CONTAINING HEAT GENERATING COMPONENT, AND EXTENSION APPARATUS FOR EXTENDING THE FUNCTION OF THE ELECTRONIC APPARATUS

CROSS-REFERENCE TO RELATED APPLICATIONS

This application is based upon and claims the benefit of priority from the prior Japanese Patent Application No. 2000-200238, filed Jun. 30, 2000, the entire contents of which are incorporated herein by reference.

BACKGROUND OF THE INVENTION

The present invention relates to a portable electronic apparatus such as a portable computer or a portable information tool and an extension apparatus for extending the function of the electronic apparatus.

To enhance the commercial value, it is greatly important for electronic apparatuses, such as portable computers, to excel in portability. The portable computers recently developed therefore have a housing that is thinner and lighter than before. They are small and light enough to be put into, for example, bags and to be carried with.

A portable computer is compact, having a thin housing. Hence, it is difficult for the housing to have spaces for accommodating connectors for connecting input/output devices to the computer, a floppy disk drive, and a CD-ROM drive. For this reason, the portable computers recently developed each have a dedicated first extension connector. The first extension connector connects the computer to an extension apparatus called a "docking station." The function of the portable computer is thereby so extended that the portable computer can perform functions that are comparable with those of desktop computers.

Conventional extension apparatuses have a box-shaped base each. The base has a flat mount section. The mount section has a size that enables the housing of a portable computer to be placed thereon. On the mount section, there is arranged a second extension connector. The second extension connector will be electrically connected to the first extension connector when the housing of the portable computer is mounted on the mount section. The base contains various extension components such as a circuit board, a floppy disk drive, a CD-ROM drive and speakers. The circuit board has a number of circuit parts mounted on it. Various connectors and ports are arranged on the side and back walls of the base. These connectors and ports are provided to connect peripheral devices such as a keyboard, a display and a printer to the computer. The connectors and ports will be electrically connected to the portable computers by the first and second extension connectors when the housing is mounted on the mount section of the base. The logic addresses and control signal paths (e.g., data buses) of the portable computer are electrically connected to those of the extension apparatus. This extends the function of the portable computer.

The portable computers that have been recently developed have an MPU (microporcessor unit) each. The MPU is designed to process useful multimedia information that represents characters, sound, speeches and images. MPUs have been improved to process information at a higher speed and to perform more functions. The faster an MPU processes information and the more functions it performs, the more electric power it will consume. There is the trend that the heat, which the MPU generates while operating, increases in proportion to the power the MPU consumes. To contain an MPU of a high calorific value in the housing of a portable computer, it is necessary to sufficiently enhance the heat radiation performance of the MPU.

In light of this, the conventional portable computers contain, in their housings, a heat sink thermally connected to the MPU, and a fan unit for supplying cooling air to the heat sink, which are used for forcibly cooling the MPU. Further, if the MPU executes a complicated operation, with the portable computer connected to an extension apparatus, it generates much more heat. For this reason, when using the portable computer with an extension apparatus connected thereto, a method for enhancing the heat radiation performance of the MPU by forcibly supplying cooling air into the housing from the extension apparatus has been tested.

Specifically, in the extension apparatus, an air vent is formed in a mount section of its base, and a fan unit is provided in the base for supplying cooling air into the air vent. On the other hand, in the portable computer, a communication hole is formed in the bottom wall of the housing opposing the mount section, and a heat sink is provided in the housing in a position corresponding to the communication hole. In this structure, when the housing of the portable computer is placed on the extension apparatus, the air vent opposes the communication hole. Accordingly, the cooling air flows into the housing through the air vent and the communication hole, and rushes onto the heat sink. As a result, the heat radiation performance of the heat sink is enhanced to thereby maintain the operation temperature of the MPU at an appropriate level.

However, where a communication hole as a cooling air inlet is formed in the bottom wall of the portable computer, the following problem will occur.

If the fan unit contained in the housing operates when using the portable computer with no extension apparatus, air outside the housing is drawn into the housing through the communication hole. This air flow disturbs the cooling air path formed in the housing.

As a result, it is very possible that the flow rate of the cooling air guided to the heat sink will be reduced or heat will be locally accumulated in the housing. This means that when using the portable computer without any extension apparatus, the heat radiation performance of the MPU may be degraded compared to the case where no communication hole is provided. Thus, it is very difficult to design a heat radiation mechanism for enhancing the heat radiation performance of the MPU.

BRIEF SUMMARY OF THE INVENTION

The object of this invention is to provide an electronic apparatus capable of maintaining, at a high level, the heat radiation performance of a heat generating component incorporated therein to thereby maintain the operation temperature of the heat generating component at an appropriate level, irrespective of whether the apparatus is used without any extension apparatus, or the apparatus is used together with an extension apparatus.

To achieve this object, according to a first aspect of the invention, there is provided an electronic apparatus comprising: a housing removably coupled to an extension apparatus, the housing containing a heat generating component and having a communication hole opposing the extension apparatus; a heat sink contained in the housing, and thermally connected to the heat generating component for absorbing and radiating heat of the heat generating component; a lid provided in the housing such that the lid is movable between a first position for closing the communication hole, and a second position for opening the communication hole, the lid being moved to the second position when the housing is connected to the extension apparatus; and urging means always urging the lid toward the first position.

In the above structure, when using the electronic apparatus without any extension apparatus, the lid is shifted to the first position and closes the communication hole. Accordingly, outside air is prevented from flowing into the housing through the communication hole, thereby preventing the flow path of the cooling air in the housing from being changed or disturbed.

When the electronic apparatus is connected to the extension apparatus, the lid shifts from the first position to the second position, thereby opening the communication hole. Although, in this case, the heat generating component generates more heat when executing a complicated operation using the connected extension apparatus, the heat sink exhibits a higher heat radiation performance by virtue of the opened communication hole. Thus, the operation temperature of the heat generating component can be maintained at an appropriate level irrespective of whether or not the electronic apparatus is connected to the extension apparatus.

According to a second aspect of the invention, there is provided an extension apparatus comprising: a main body containing a heat generating component and having an outer wall, the outer wall having a communication hole formed therein; a heat sink contained in the main body, and thermally connected to the heat generating component for absorbing and radiating heat of the heat generating component; a lid having heat conductivity, and provided in the main body such that the lid is movable between a first position for closing the communication hole, and a second position for opening the communication hole, the lid being thermally disconnected from the heat sink when it is in the first position, and thermally connected to the heat sink when it is in the second position; urging means always urging the lid toward the first position; and an extension apparatus on which the main body is removably mounted, the extension apparatus having components for extending a function of the main body, and operation means for shifting the lid from the first position to the second position against an urging force of the urging means, when the main body is mounted on the extension apparatus.

In the above structure, when using the electronic apparatus without any extension apparatus, the lid is shifted to the first position and closes the communication hole. Accordingly, the lid is thermally disconnected from the heat sink, thereby preventing the heat of the heat generating component from being transmitted to the lid. This being so, even when the operator touches the lid while carrying out the electronic apparatus, the lid is not hot to the touch.

Furthermore, since the communication is closed, outside air is prevented from flowing into the housing through the communication hole, thereby preventing the flow path of the cooling air in the housing from being changed or disturbed.

When the electronic apparatus is mounted on the extension apparatus, the lid shifts from the first position to the second position, thereby thermally connecting the lid to the heat sink. As a result, the heat capacity and the heat radiation area of the heat sink are increased by the amount of those of the lid. In addition, when the lid is shifted, the communication hole is opened. The heat sink that receives the heat of the heat generating component can be effectively cooled by cooling air supplied thereto from the extension apparatus through the communication hole. Consequently, even if the heat generating component generates more heat when executing a complicated operation using the connected extension apparatus, the heat sink exhibits a higher heat radiation performance by virtue of the opened communication hole. Thus, the operation temperature of the heat generating component can be maintained at an appropriate level irrespective of whether or not the electronic apparatus is connected to the extension apparatus.

According to a third aspect of the invention, there is provided an extension apparatus to be removably coupled to an electronic apparatus that includes a housing having a communication hole, a lid provided in the housing such that it is movable between a first position for closing the communication hole, and a second position for opening the communication hole, and a heat generating component contained in the housing, comprising: a base on which the housing of the electronic apparatus is removably mounted; components contained in the base for extending a function of the electronic apparatus; operation means for shifting the lid from the first position to the second position when the electronic apparatus is mounted on the base; and blower means contained in the base for blowing cooling air to the communication hole formed in the electronic apparatus placed on the base.

In the above structure, when using the electronic apparatus without any extension apparatus, the lid closes the communication hole. Accordingly, outside air is prevented from flowing into the housing through the communication hole, thereby preventing the flow path of the cooling air in the housing from being changed or disturbed.

When the electronic apparatus is mounted on the extension apparatus, the lid shifts from the first position to the second position, thereby opening the communication hole. When the blower means is operated, cooling air is guided into the housing of the electronic apparatus through the communication hole. Thus, the ventilation in the housing is enhanced and the amount of air applied to the heat sink is increased. Consequently, even if the heat generating component generates more heat when executing a complicated operation using the connected extension apparatus, the heat sink exhibits a higher heat radiation performance by virtue of the opened communication hole. Thus, the operation temperature of the heat generating component can be maintained at an appropriate level irrespective of whether or not the electronic apparatus is connected to the extension apparatus.

According to a fourth aspect of the invention, there is provided an electronic apparatus system comprising: an electronic apparatus having a housing, a heat generating component provided in the housing, and a heat sink thermally connected to the heat generating component; and an extension apparatus having a base on which the housing of the electronic apparatus is removably mounted, and components provided in the base for extending a function of the electronic apparatus, wherein the housing of the electronic apparatus has a communication hole opposing the base, and a lid having heat conductivity and provided in the housing such that the lid is movable between a first position for closing the communication hole, and a second position for opening the communication hole, the lid being thermally disconnected from the heat sink when it is in the first position, and thermally connected to the heat sink when it is in the second position; and the extension apparatus has operation means for shifting the lid from the first position to the second position when the housing of the electronic apparatus is mounted on the base, and also has blower means for blowing cooling air into the communication hole.

In the above structure, when using the electronic apparatus without any extension apparatus, the lid is shifted to the first position and closes the communication hole. Accordingly, the lid is thermally disconnected from the heat sink, thereby preventing the heat of the heat generating component from being transmitted to the lid. This being so, even when the operator touches the lid while carrying out the electronic apparatus, the lid is not hot to the touch.

Furthermore, since the communication is closed, outside air is prevented from flowing into the housing through the communication hole, thereby preventing the flow path of the cooling air in the housing from being changed or disturbed.

When the electronic apparatus is mounted on the extension apparatus, the lid shifts from the first position to the second position, thereby thermally connecting the lid to the heat sink. As a result, the heat capacity and the heat radiation area of the heat sink are increased by the amounts of those of the lid. In addition, when the lid is shifted, the communication hole is opened. Through the opened communication hole, cooling air is supplied into the housing by the blower means, thereby enhancing the ventilation in the housing and increasing the amount of cooling air directed to the heat sink. Consequently, even if the heat generating component generates more heat when executing a complicated operation using the connected extension apparatus, the heat sink shows a higher heat radiation performance by virtue of the opened communication hole. Thus, the operation temperature of the heat generating component can be maintained at an appropriate level irrespective of whether or not the electronic apparatus is connected to the extension apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A portable computer according to the embodiment of the present invention will be described with reference to the accompanying drawings.

Figure 1:
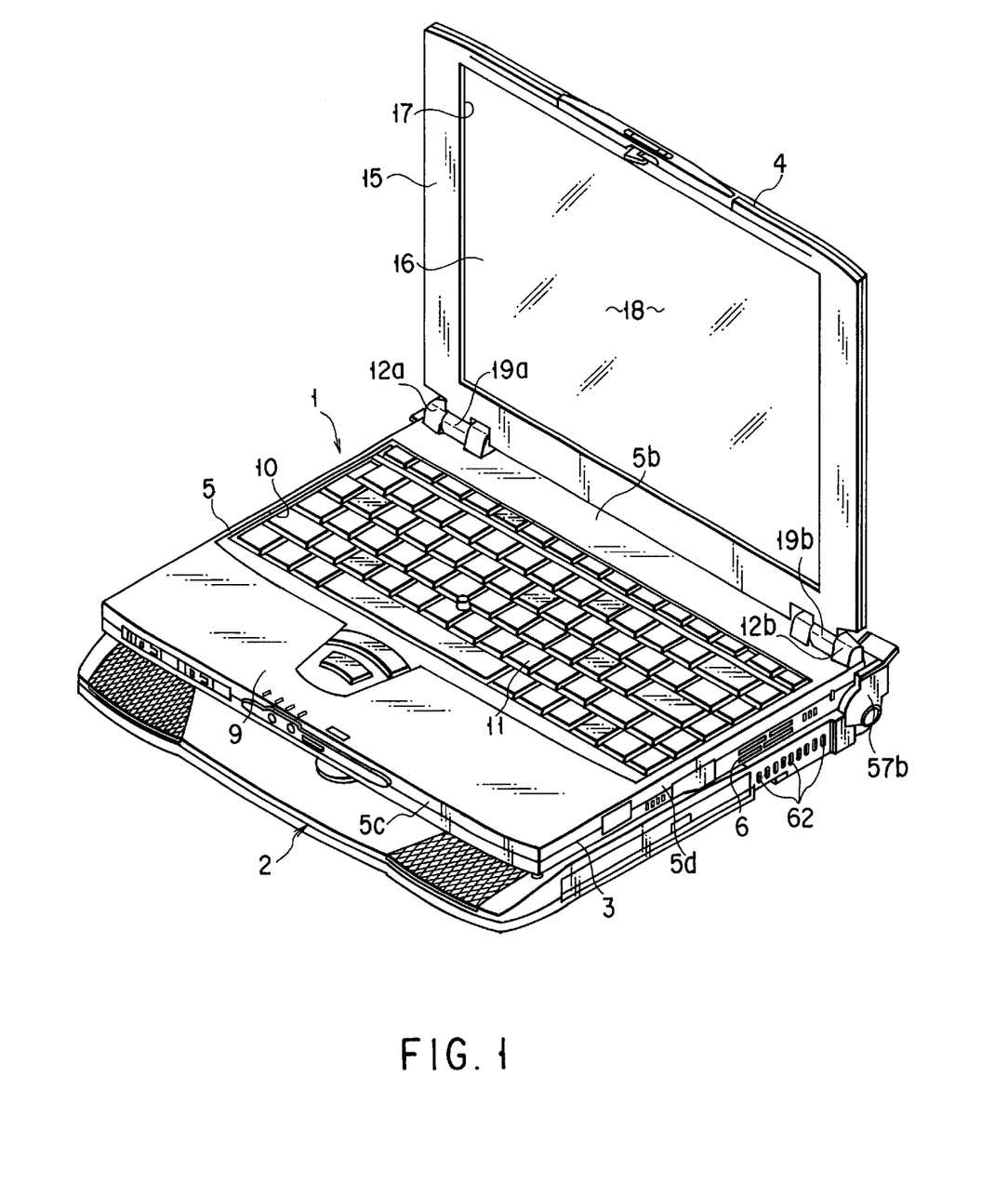
FIG. 1 is a perspective view of an electronic apparatus system according to the embodiment of the invention, showing an extension apparatus and a portable computer connected to the extension apparatus.
Figure 2:
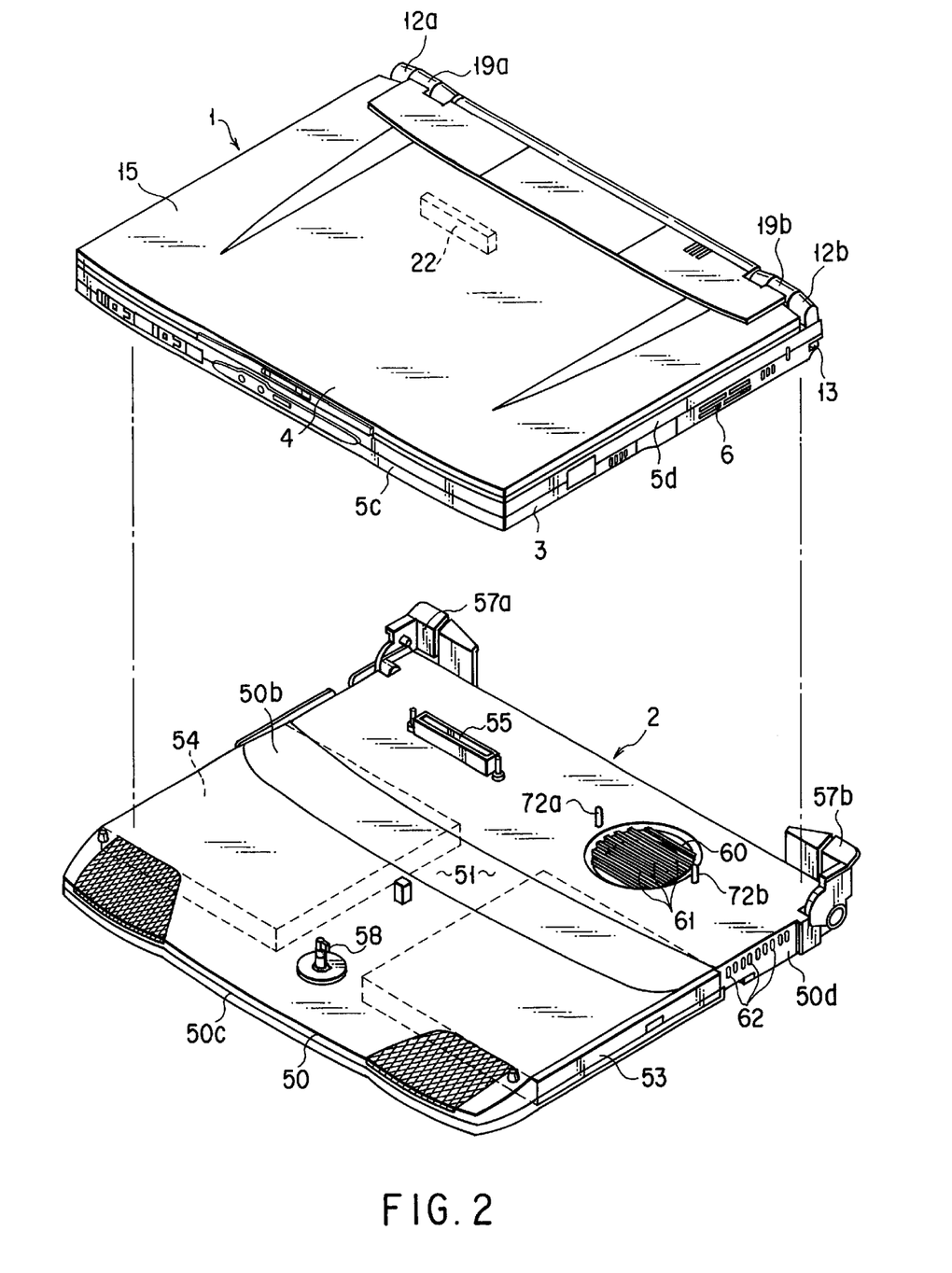
FIG. 2 is a perspective view of the electronic apparatus system according to the embodiment of the invention, showing a state in which the extension apparatus and the portable computer are separated from each other.

FIGS. 1 and 2 show a portable computer 1 as an electronic apparatus, and an extension apparatus 2 for extending the function of the portable computer 1.

The portable computer 1 comprises a main body 3 and a display unit 4 supported by the main body 3. The main body 3 has a housing 5. The housing 5 has a bottom wall 5a, a top wall 5b, a front wall 5c, two side walls 5d, and a rear wall 5e. The housing 5 is shaped like a flat box. The right-hand side wall 5d has outlet ports 6. The outlet ports 6 are formed in a rear part of the side wall 5d.

The top wall 5b of the housing 5 has a palm rest 9 and a keyboard attachment section 10. The palm rest 9 is located at a front end portion of the housing 5. The keyboard attachment section 10 is located behind the palm rest 10. A keyboard 11 is fitted in the keyboard attachment section 10. A pair of display supports 12a and 12b are provided on a rear part of the top wall 5b of the housing 5. The display supports 12a and 12b protrude upwards and are spaced apart in the width direction of the housing 5.

As shown in FIG. 2, the housing 5 has two engagement recesses 13 in rear parts of the side walls 5d, respectively. The engagement recesses 13 are used to connect the portable computer 1 to the extension apparatus 2.

The display unit 4 comprises a display housing 15 and a liquid crystal display 16. The display housing 15 is shaped like a flat box and has an opening 17 in the front. The liquid crystal display 16 has a screen 18 for displaying information such as characters and images. The screen 18 is exposed to the outside of the display housing 15 through the opening 17.

The display housing 15 has two legs 19a and 19b. The legs 19a and 19b protrude from one side of the display housing 15 to the display supports 12a and 12b. The legs 19a and 19b are rotatably coupled to the housing 5 of the main body 3 by respective hinge devices (not shown). The display unit 4 can therefore pivot between a closed position and an opened position. In the closed position, the display unit 4 covers the palm rest 9 and the keyboard 11 from above. In the opened position, the display unit 4 stands upright at the back of the keyboard 11.

Figure 3:
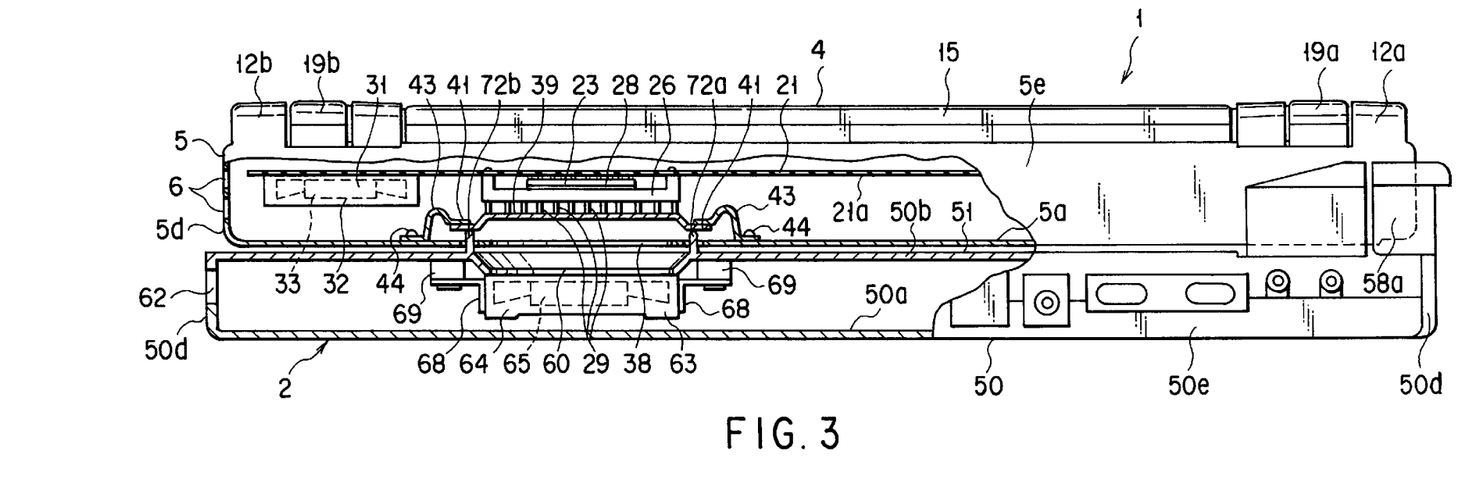
FIG. 3 is a sectional view of the electronic apparatus system according to the embodiment of the invention, showing the state in which the portable computer is connected to the extension apparatus.

As shown in FIG. 3, the housing 5 contains a circuit board 21. The circuit board 21 extends parallel to the bottom wall 5a of the housing 5. The lower surface 21a of the circuit board 21 is opposed to the bottom wall 5a. A first extension connector 22 is mounted on a rear end portion of the lower surface 21a of the circuit board 21. The first extension connector 22 is exposed at the bottom wall 5a of the housing 5.

Figure 5:
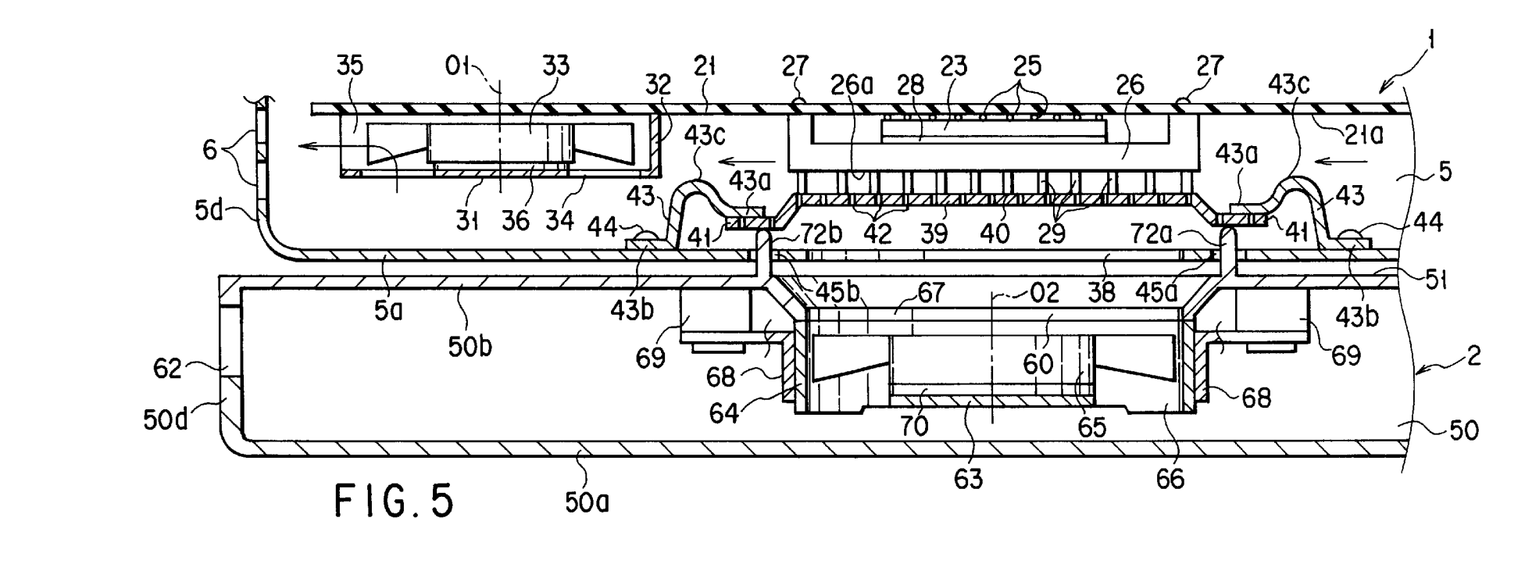
FIG. 5 is a sectional view of the electronic apparatus system according to the embodiment of the invention, showing a state in which the portable computer is placed on the extension apparatus, and the lid is raised to a second position, thereby opening a communication hole.

As shown in FIGS. 3 and 5, a MPU (microprocessor unit) 23, or a heat generating component, is mounted on the lower surface 21a of the circuit board 21. The MPU 23 is located at the rear of the housing 5. The MPU 23 is formed of a semiconductor package (circuit component) of, for example, the BGA type, and soldered to the lower surface 21a of the circuit board 21 by a large number of solder balls 25. Since the MPU 23 processes, at high speed, multimedia information that represents characters, sound, speeches and images, it consumes much electric power while operating. Therefore, the MPU 23 generates a large amount of heat during the operation and hence needs to be cooled.

A heat sink 26 is provided on the lower surface 21a of the circuit board 21. The heat sink 26 is made of a metal having high thermal conductivity, such as aluminum alloy. The heat sink 26 is in the shape of a rectangular flat plate larger than the MPU 23, and has its corners fixed to the circuit board 21 by screws 27.

The heat sink 26 is thermally connected to the MPU 23 via a heat conductive sheet 28. Accordingly, the heat sink 26 absorbs the heat of the MPU 23 and radiates it in the housing 5.

The heat sink 26 has a plurality of heat radiating fins 29. The heat radiating fins 29 downwardly protrude from the lower surface 26a of the heat sink 26. The lower ends of the heat radiating fins 29 are located above the bottom wall 5a.

As shown in FIGS. 3 and 5, a first fan unit 31 is attached to the lower surface 21a of the circuit board 21, and interposed between the heat sink 26 and the right-hand wall 5d of the housing 5. The first fan unit 31 comprises a fan casing 32 and a rotor 33. The fan casing 32 is shaped like a flat box and has an inlet port 34 and an outlet port 35. The inlet port 34 downwardly opens within the housing 5 and opposes to the bottom wall 5a. The outlet port 35 opens toward the outlet ports 6 formed in the side wall 5d. The rotor 33 is rotated by a flat motor 36, which is secured to the fan casing 32. The first fan unit 31, thus constructed, is set in horizontal position within the housing 5 with the axis O1 of the rotor 33 extending vertically.

The first fan unit 31 is driven when the temperature of the MPU 23 exceeds an operation securing temperature set for it. Once the unit 31 is thus driven, air in the housing 5 is suctioned into the inlet port 34. As a result, the flow of cooling air directed to the first fan unit 31 occurs as indicated by the arrows in FIG. 5. The heat sink 26 is situated at a middle portion of the cooling air flow. While flowing through the housing 5, the cooling air forcibly cools the heat sink 26. The cooling air, heated as a result of heat exchange with the heat sink 26, is discharged to the outside of the housing 5 through the outlet ports 6.

Figure 4:
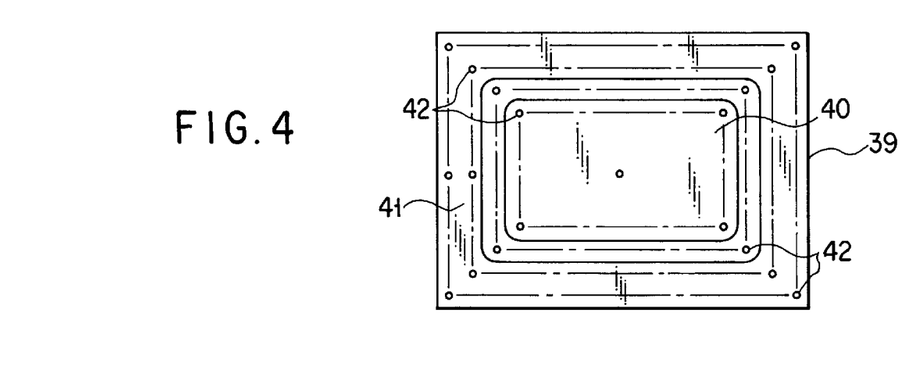
FIG. 4 is a plan view of a lid incorporated in the system.

A communication hole 38 is formed in the bottom wall 5a of the housing 5 just below the heat sink 26. The communication hole 38 has substantially the same size as the lower surface 26a of the heat sink 26. A lid 39 for opening and closing the communication hole 38 is provided in the housing 5. The lid 39 is made of a metal having high thermal conductivity, such as aluminum alloy. As shown in FIGS. 4 and 5, the lid 39 has a main body 40 and seal section 41. The main body 40 is interposed between the heat sink 26 and the communication hole 38, and formed of a plate of a size slightly larger than the communication hole 38. The seal section 41 downwardly extends from an outer peripheral edge portion of the main body 40, and touches the inner surface of the bottom wall 5a around the communication hole 38. A plurality of small holes 42 are formed in the main body 40 and the seal section 41 of the lid 39 and arranged in a matrix.

The lid 39 is secured to the bottom wall 5a via spring members 43 as pressing means. Each spring member 43 has a free end 43a, a stationary end 43b and an elastically deformable section 43c. The free end 43a is secured to the upper surface of the seal section 41. The stationary end 43b is fixed to the bottom wall 5a by a screw 44. The elastically deformable section 43c connects the free end 43a to the stationary end 43b. The elastically deformable section 43c is elastically deformable toward and away from the bottom wall 5a, and always presses, using its spring force, the free end 43a toward the bottom wall 5a.

Accordingly, the lid 39 is movable between a first position (shown in FIG. 6) in which the seal section 41 touches the bottom wall 5a, and a second position (shown in FIG. 5) in which the seal section 41 is separated from the bottom wall 5a. The spring member 43 always presses the lid 39 toward the first position. When the lid 39 is in the first position, it closes the communication hole 38, and its main body 40 is separated from the heat radiation fins 29 incorporated in the heat sink 26. Thus, the lid 39 is thermally disconnected to the heat sink 26. On the other hand, when the lid 39 is in the second position, the communication hole 38 is open, and the main body 40 is in contact with the heat radiation fins 29 of the heat sink 26. Thus, the lid 39 is thermally connected to the heat sink 26.

Figure 6:
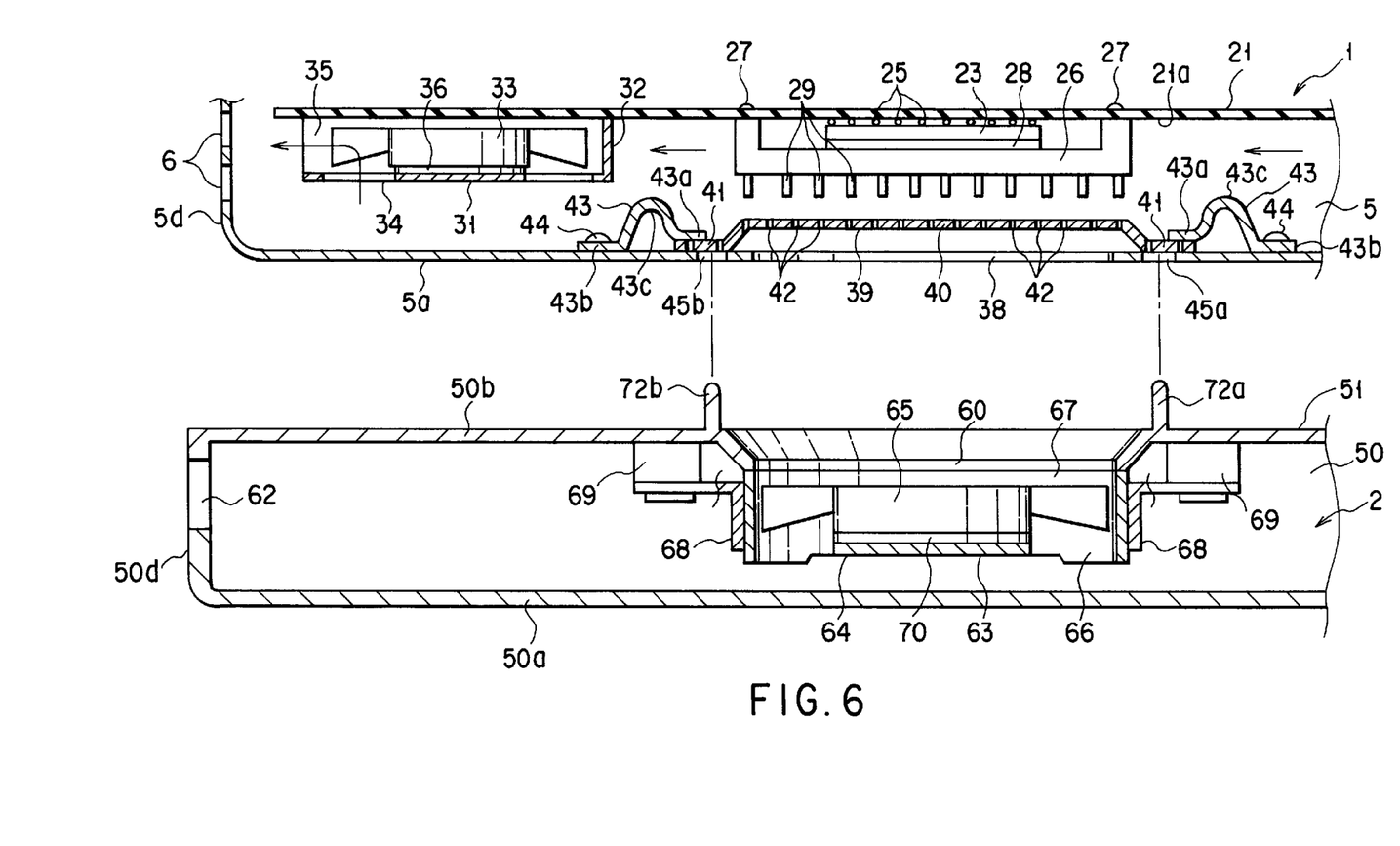
FIG. 6 is a sectional view of the electronic apparatus system according to the embodiment of the invention, showing a state in which the portable computer is separated from the extension apparatus, and the lid is returned to a first position, thereby closing the communication hole.

As shown in FIG. 6, the bottom wall 5a has a pair of through holes 45a and 45b, which are opposed to each other with the communication hole 38 interposed therebetween. The through holes 45a and 45b face corresponding portions of the seal section 41 of the lid 39, and are blocked by the seal section 41 when the lid 39 is in the first position.

As seen from FIGS. 2 and 3, the extension apparatus 2 has a base 50. The base 50 is a flat box having a bottom wall 50a, a top wall 50b, a front wall 50c, left and right side walls 50d, and a rear wall 50e. The base 50 may be mounted on, for example, the top plate of a desk.

The base 50 has a flat mount section 51. The mount section 51 is made of the top wall 50b of the base 50. The mount section 51 has a size slightly larger than the bottom wall 5a of the housing 5 of the portable computer 1, and enables the housing 5 to be removably mounted thereon.

The base 50 contains a CD-ROM drive 53 or a floppy disk drive 54. These drives 53 and 54 are components that extend the function of the portable computer 1. Both drives 53 and 54 are electrically connected to a second extension connector 55. The second extension connector 55 is placed on the mount section 51. Accordingly, when the housing 5 of the portable computer 1 is placed on the mount section 51, the first and second extension connectors 22 and 55 are engaged with each other, one fitted into the other. Thus, the portable computer 1 is electrically connected to the extension apparatus 2.

As seen from FIG. 2, the extension apparatus 2 has a pair of rear lock levers 57a and 57b and a front lock lever 58. The lock levers 57a, 57b and 58 are provided to lock the housing 5 of the computer 1 to the mount section 51. The rear lock levers 57a and 57b are spaced apart in the widthwise direction of the base 50, at the rear end of the mount section 51. The rear lock levers 57a and 57b are supported by the base 50, and can rotate between a locked position and a released position. In the locked position, each rear lock lever fits in the corresponding engagement recess 13 of the housing 5. In the released position, each rear lock lever is outside the corresponding engagement recess 13. The front lock lever 58 is located at a front-middle part of the mount section 51. The front lock lever 58 is supported by the base 50, and can vertically move between a locked position and a released position. In the locked position, the front lock lever 58 holds the bottom wall 5a of the housing 5. In the released position, the front lock lever 58 is released from the bottom wall 5a of the housing 5.

Hence, when the portable computer 1 is mounted on the mount section 51 of the base 50, it is locked to the mount section 51 at three parts, i.e., two rear end parts and one front end part. Thus, the engagement of the first extension connector 22 with the second extension connector 55 is maintained.

As FIGS. 2 and 3 show, the mount section 51 of the base 50 has a vent 60. The vent 60 is made in a rear part of the mount section 51; it communicates with the interior of the base 50. When the portable computer 1 is locked to the mount section 51, the vent 60 opposes the communication hole 38 formed in the bottom wall 5a of the portable computer 1. A grill-shaped guard 61 is provided at the vent 60 for preventing a foreign bit such as a clip from entering the interior of the apparatus. A plurality of suction ports 62 are formed in a rear end part of the right-hand side wall 50d of the base 50.

The base 50 contains a second fan unit 63 as blower means. The second fan unit 63 is located just below the vent 60. The second fan unit 63 has a fan casing 64 and a rotor 65. The fan casing 64 is shaped like a flat box. The casing 64 has an inlet port 66 and an outlet port 67, which oppose each other. A plurality of brackets 68 are secured to the outer periphery of the fan casing 64. The brackets 68 are secured by screws to seats 69 that extend downwards from the inner surface of the top wall 50b. Therefore, the fan casing 64 is fastened to the base 50, with the outlet port 67 and inlet port 66 opposing the vent 60 and the bottom wall 50a, respectively. The rotor 65 is interposed between the inlet port 66 and the outlet port 67, and arranged to be driven by a flat motor 70, which is secured to the fan casing 64. The second fan unit 63, thus structured, is positioned in the base 50 with the axis O2 of the rotor 65 extending vertically.

While the portable computer 1 is being used with the expansion apparatus 2 connected thereto, the second fan unit 63 is driven, along with the first fan unit 31, when the temperature of the MPU 23 exceeds an operation securing temperature set for it. Once the second fan unit 63 is thus driven, air in the base 50 is suctioned into the inlet port 66. This air serves as cooling air and flows from the outlet port 67 to the vent 60.

As FIG. 2 or 6 shows, the top wall 50b of the base 50 has a pair of rods 72a and 72b as operation means. The rods 72a and 72b upwardly extend from the top wall 50b of the base 50, and oppose each other with the vent 60 interposed therebetween. When the portable computer 1 is placed on the mount section 51 of the base 50, the rods 72a and 72b are inserted in the through holes 45a and 45b formed in the bottom wall 5a of the housing 5, respectively. Accordingly, the upper ends of the rods 72a and 72b come into contact with corresponding portions of the seal section 41 of the lid 39, whereby the lid 39 is raised from the first position to the second position against the spring force of the spring members 43. As a result, the communication hole 38 is automatically opened and the main body 40 of the lid 39 is thermally connected to the heat radiation fins 29 of the heat sink 26.

In the above structure, in order to extend the function of the portable computer 1, the housing 5 of the computer 1 is mounted on the mount section 51 of the base 50, thereby connecting the first and second extension connectors 22 and 55 to each other. Then, the housing 5 is locked to the mount section 51 by means of the rear lock levers 57a and 57b and the front lock lever 58. The portable computer 1 is thereby connected to the extension apparatus 2 electrically.

Where the portable computer 1 is locked to the mount section 51 as shown in FIG. 5, the communication hole 38 of the housing 5 opposes the vent 60 of the mount section 51. At the same time, the pair of rods 72a and 72b projecting from the mount section 51 are inserted into the through holes 45a and 45b and brought into contact with the seal section 41 of the lid 39. The rods 72a and 72b raise the lid 39 against the spring force of the spring members 43 from the first position to the second position. As a result, the seal section 41 of the lid 39 is separated from the inner surface of the bottom wall 5a, thereby opening the communication hole 38. Further, the main body 40 of the lid 39 comes into contact with the heat radiation fins 29 of the heat sink 26, whereby the lid 39 is thermally connected to the heat sink 26. Since the lid 39 has a heat conductivity, the heat capacity and the heat radiation area of the heat sink 26 increase by those of the lid 39. Consequently, the heat of the MPU 23 is diffused to the heat sink 26 and the lid 39 through heat conduction, and discharged to the interior of the housing 5 therefrom.

As long as the portable computer 1 is used, while connected to the extension apparatus 2, the temperature of the MPU 23 may exceed an operation securing temperature set for it. In this event, both the first and second fan units 31 and 63 are driven. The first fan unit 31 draws air in the housing 5, thereby causing, in the housing 5, the flow of cooling air directed to the first fan unit 31. The cooling air forcibly cools the heat sink 26 and the lid 39 exposed thereto in the housing 5. Thus, the cooling air absorbs the heat of the MPU 23, which is transmitted to the heat sink 26 and the lid 39. The cooling air, which is heated as a result of this heat absorption, is discharged to the outside of the housing 5 through the outlet ports 6.

The second fan unit 63 draws air existing in the base 50. This air serves as cooling air and upwardly flows into the housing 5 through the vent 60 and the communication hole 38. This cooling air is mainly blown onto the lid 39 thermally connected to the heat sink 26. Part of the cooling air flows into a space between the lid 39 and the heat sink 26 through small holes 42, thereby rushing onto the lower surface of the heat sink 26 and the heat radiation fins 29.

As a result, the flow rate of the cooling air guided onto the heat sink 26 or the lid 39 increases. Consequently, even when the MPU 23 executes a complicated operation and hence generates a large amount of heat, the generated heat can be sufficiently radiated. This means that even when the MPU 23 is operating at its maximum capacity, its operation temperature can be kept appropriately.

On the other hand, if the portable computer 1 is used without being connected to the extension apparatus 2, the lid 39 is kept in the first position by the force of the spring members 43, as shown in FIG. 6. In this state, the seal section 41 of the lid 39 is pressed against the inner surface of the bottom wall 5a of the housing 5, thereby closing the communication hole 38 from inside.

Accordingly, when the temperature of the MPU 23 increases and the first fan unit 31 is driven, air outside the housing 5 is not drawn into the housing 5 through the communication hole 38. This prevents cooling air from flowing irregularly in the flow path, thereby preventing the flow rate of the cooling air guided to the heat sink 26 from reducing, or preventing heat from being locally accumulated in the housing 5. Thus, irrespective of the communication hole 38 formed in the bottom wall 5a, the heat radiation performance of the heat sink 26 is not reduced, and therefore the operation temperature of the MPU 23 can be maintained at an appropriate level.

Furthermore, as long as the lid 39 is in the first position, the main body 40 of the lid 39 is away from the heat radiation fins 29 of the heat sink 26, which means that the lid 39 is thermally disconnected from the heat sink 26. Accordingly, heat conduction from the heat sink 26 to the lid 39 is interrupted, thereby preventing the temperature increase of the lid 39. If the lid 39 were hot to the touch, the user might drop the computer 1 out of surprise. However, as the lid 39 does not get hot, this kind of accident cannot occur.

As described above, in accordance with the manner of use of the portable computer 1, the communication hole 38 formed in the bottom wall 5a of the housing 5 can be automatically opened or closed. Accordingly, when using the portable computer 1 with or without the extension apparatus 2 connected thereto, the heat radiation performance of the MPU 23 can be maintained at a high level. This makes it easy to design the heat radiation mechanism of the MPU 23 for maintaining the operation temperature of the MPU 23.

The present invention is not limited to the embodiments described above. Rather, various changes and modifications can be made, without departing from the scope and spirit of the invention.

For example, in the above embodiments, the housing of the portable computer contains the first fan unit. However, the heat radiation of the MPU may be executed through heat conduction by natural convection, instead of using the fan unit. Also in this case, if the communication hole formed in the bottom wall of the housing is open when using the portable computer without any extension apparatus, it is possible that the air convection path in the housing may be biased by air flowing therein through the communication hole. In light of this, it is important, as well as to execute forcible air cooling, to open and close the communication hole in accordance with the manner of use of the portable computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a housing to be removably coupled to an extension apparatus, the housing containing a heat generating component and having a communication hole to oppose the extension apparatus;
   a heat sink contained in the housing, and thermally connected to the heat generating component for absorbing and radiating heat of the heat generating component;
   a lid having heat conductivity, and provided in the housing such that the lid is movable between a first position for closing the communication hole and a second position for opening the communication hole and thermally connected to the heat sink, the lid being moved to the second position when the housing is connected to the extension apparatus; and
   a spring member always urging the lid toward the first position.

2. The electronic apparatus according to claim 1, further comprising a fan unit contained in the housing, the fan unit drawing air existing in the housing to thereby cause flow of cooling air, the heat sink being situated in a path of the cooling air.

3. The electronic apparatus according to claim 1, wherein the lid is thermally disconnected from the heat sink when the lid is in the first position.

4. The electronic apparatus according to claim 3, wherein the heat sink has a plurality of heat radiation fins thermally connected to the lid when the lid is in the second position.

5. The electronic apparatus according to claim 4, wherein the lid has a plurality of holes.

6. An electronic apparatus to be removably mounted on an extension apparatus, the extension apparatus having components for extending a function of the electronic apparatus and at least one rod projecting toward the electronic apparatus when the electronic apparatus is mounted on the extension apparatus, the electronic apparatus comprising:
   a main body containing a heat generating component and having an outer wall, the outer wall having a communication hole formed therein;
   a heat sink contained in the main body, and thermally connected to the heat generating component for absorbing and radiating heat of the heat generating component; and
   a lid having heat conductivity, and provided in the main body such that the lid is movable between a first position for closing the communication hole and a second position for opening the communication hole, the lid being continuously urged to the first position by a spring member and thermally disconnected from the heat sink, the lid being shifted from the first position to the second position against an urging force of the spring member, and then thermally connected to the heat sink, when the main body is mounted on the extension apparatus.

7. The electronic apparatus according to claim 6, further comprising:
   a fan unit contained in the main body, the fan unit drawing air existing in the main body to thereby cause flow of cooling air, the heat sink being situated in a path of the cooling air.

8. The electronic apparatus according to claim 7, wherein the communication hole opposes the heat sink, the heat sink has a plurality of heat radiation fins thermally connected to the lid when the lid is in the second position, and the lid has a plurality of holes.

9. The electronic apparatus according to claim 6, wherein the lid has a seal section provided around the communication hole and to be brought into contact with an inner surface of the outer wall, the outer wall has at least one through hole formed around the communication hole and opposing the seal section, and the at least one rod is passed through the at least one through hole and brought into contact with the seal section, thereby separating the seal section from the outer wall, when the main body is mounted on the extension apparatus.

10. An extension apparatus to be removably coupled to an electronic apparatus, the electronic apparatus including a housing having a communication hole, a heat generating component contained in the housing, a lid having heat conductivity and provided in the housing such that the lid is movable between a first position for closing the communication hole and a second position for opening the communication hole and thermally connected to the heat sink, the extension apparatus comprising:
   a base on which the electronic apparatus is to be removably mounted;
   components contained in the base for extending a function of the electronic apparatus;

operation means for shifting the lid from the first position to the second position when the electronic apparatus is mounted on the base; and a fan unit contained in the base for blowing cooling air to the communication hole and onto the lid when the electronic apparatus is mounted on the base.

11. The extension apparatus according to claim 10, wherein the base includes a vent to oppose the communication hole of the electronic apparatus and provided for passing therethrough the cooling air, the fan unit being contained in the base such that the fan unit opposes the vent.

12. The extension apparatus according to claim 10, wherein the lid has a seal section provided around the communication hole and to be brought into contact with an inner surface of the housing, the housing has at least one through hole formed around the communication hole and opposing the seal section, and the operation means has at least one rod to be inserted into the at least one through hole, the at least one rod being passed through the at least one through hole and brought into contact with the seal section, thereby separating the seal section from the housing, when the electronic apparatus is mounted on the base.

13. An electronic apparatus comprising:

a housing to be removably coupled to an extension apparatus, the housing containing a heat generating component and having a communication hole to oppose the extension apparatus;

a heat sink contained in the housing, and thermally connected to the heat generating component for absorbing and radiating heat of the heat generating component;

a lid having heat conductivity, and provided in the housing such that the lid is movable between a first position closing the communication hole and a second position for opening the communication hole, the lid being thermally disconnected from the heat sink when the lid is in the first position and thermally connected to the heat sink when the lid is in the second position; and a spring member always urging the lid toward the first position.

14. The electronic apparatus according to claim 13, wherein the communication hole is located opposite to a vent formed in the extension apparatus when the housing is mounted on the extension apparatus such that a fan unit contained in the extension apparatus blows cooling air into the vent and onto the lid shifted to the second position.

15. The electronic apparatus according to claim 14, wherein the lid includes a plurality of holes and part of the cooling air is blown onto the heat sink through the holes.

* * * * *